Aug. 16, 1960 C. F. ABISSI 2,949,292

PERFORATING APPARATUS

Filed Oct. 29, 1957 2 Sheets-Sheet 1

United States Patent Office 2,949,292

Patented Aug. 16, 1960

2,949,292

PERFORATING APPARATUS

Carl F. Abissi, Vestal, N.Y., assignor to International Business Machines Corporation, New York, N.Y., a corporation of New York Filed Oct. 29, 1957, Ser. No. 693,080

7 Claims. (Cl. 269—160)

This invention relates to a device for punching out portions of a sheet material which is adapted to insure the complete severance and removal of the punched-out portions from the sheet. The invention relates particularly to apparatus for facilitating the recording of information in a record card by punching out previously scored portions of the card to provide index slits defining areas of recordation having means to insure the positive and complete separation of the punched-out portions from the card, and which is especially well suited for use in portable, manually operated devices for this purpose.

Machines controlled by normally nonconductive record cards perforated in a predetermined pattern to provide slits capable of being electrically sensed by the machine have come into widespread use for tabulating data, statistical studies, accounting and similar applications. Perforated payroll checks, insurance premium notices and the like processed by such machines have in fact become a commonplace of everyday life. It is imperative for accurate operation of such machines that the record cards employed contain only sharply defined unobstructed index slits of critical dimensions. It is essential, therefore, that portions of the record cards punched out to provide these index slits be completely severed and removed from the record card. Otherwise chips punched from the card but not completely severed therefrom may partially or totally close the intended slit and thus prevent sensing of the slit by the processing machine. Precision punching machines, which for the most part are too bulky to be conveniently portable, are capable of entering the required sharply defined, critically dimensioned slits in large numbers of record cards while assuring complete removal of punched-out chips from the perforated cards. These machines are, however, of little use when it is desired to record data on record cards in the field where it would be inconvenient or impossible to carry a precision punching machine. This problem has been met recently by the provision of compact, portable, perforating mechanisms employing a hand-held stylus and pre-scored record cards.

Devices of this type typically comprise a backing plate containing a plurality of holes corresponding to the index positions in a record card. The backing plate may also be provided with means to receive and position a record card above the plate with its index positions aligned with the holes in the backing plate. The index positions of the record cards employed in such devices are defined by scorings which enclose substantially but not completely the individual index positions thus weakening the bond between these areas and the surrounding portions of the card. In operation the pre-scored record card is inserted in the perforating device above the perforated backing plate and held in position by guides or other means with its index positions aligned with the holes in the base plate. A hand-held stylus is then pressed against any desired index position in the record card. Light but firm pressure on the stylus serves to break the weakened index area away from the surrounding record card and force the punched-out chip through the corresponding hole in the backing plate.

These devices while convenient for use in the field frequently suffer from the disadvantage that chips punched from the record cards are not completely severed therefrom and removed from the cards, thus remaining to obstruct the intended index slits and ultimately cause inaccurate operation of a machine controlled by the cards.

It is therefore a primary object of the present invention to provide an apparatus for punching out portions of a sheet material having means for insuring the complete severance and removal of the punched-out portions from the work piece.

It is a further object of the invention to provide a backing board for use in an apparatus for perforating sheet material which is adapted to grip or encompass punched-out portions of the sheet material to prevent them from adhering to the work piece even when not completely severed therefrom by the initial punching operation.

It is another object of the present invention to provide an apparatus adapted to produce sharply defined, critically dimensioned, index slits in a record card by punching out previously scored index portions of such a card, which apparatus also insures the complete severance and positive removal of the punched-out index portions.

It is a further object of the invention to provide a perforating device for use with pre-scored record cards which includes a chip-retaining backing board.

It is another object of the invention to provide a portable perforating device comprising an improved backing board adapted to positively strip punched-out chips from a stylus.

It is yet another object of the invention to provide an apparatus of the character described which may be simply and inexpensively constructed, operated and maintained.

These and other objects of the invention and the manner in which they are attained will be apparent from the following detailed description of the preferred embodiment illustrated in the accompanying drawings in which.

Figures 1, 2:
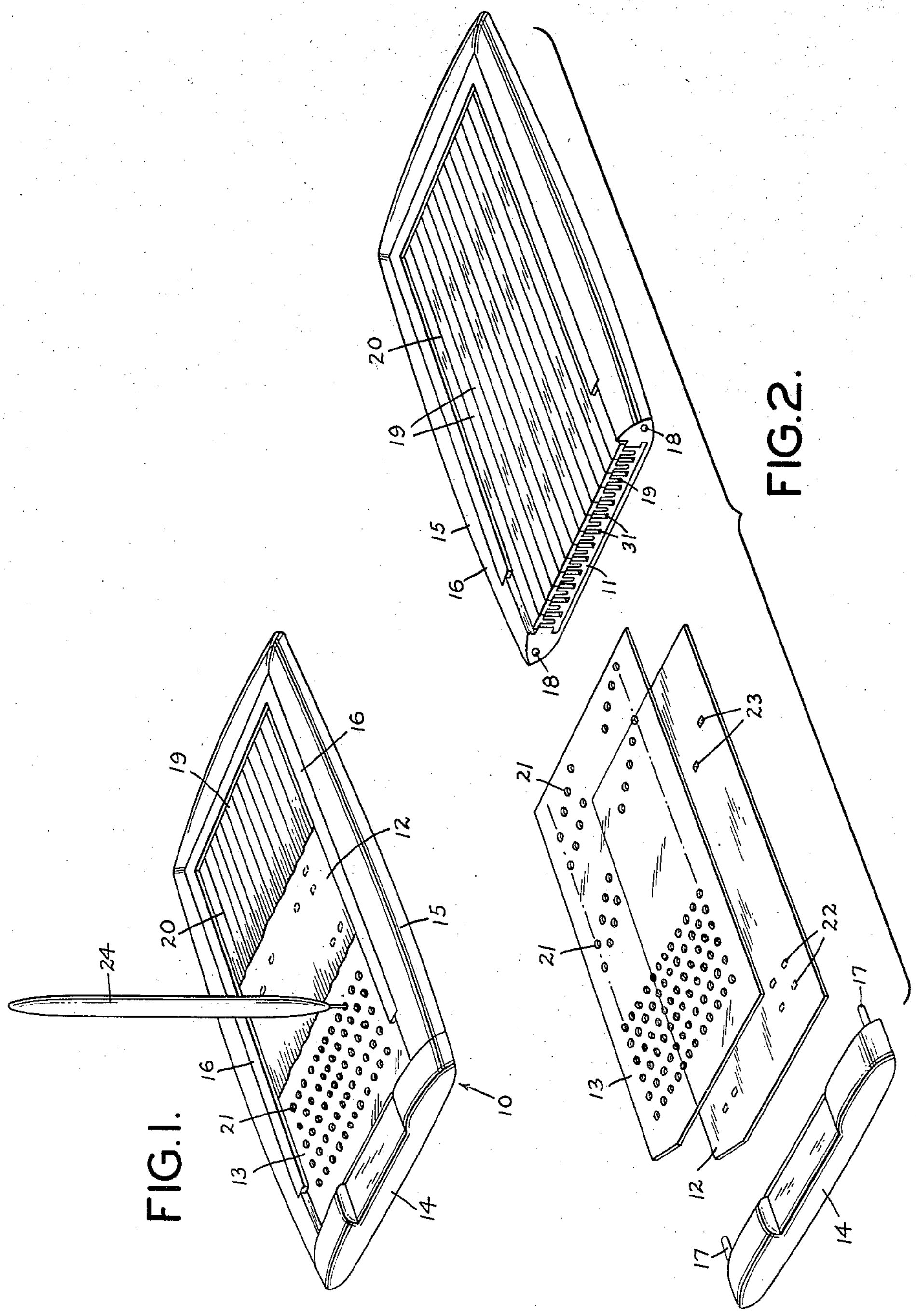
Figure 1 is a perspective view of an apparatus constructed in accordance with the present invention, showing a stylus for use therewith.
Figure 2 is an exploded view thereof.

Figures 4, 5, 6, 7 and 8 constitute a series of fragmentary cross-sectional views of the chip-retaining backing board assembly.

An important feature of the present invention resides in the provision of backing means for use in removing punch-outs from an area of a sheet material as it is punched by a perforating device in which at least two resilient backing members or lip portions capable of relative flexing movement are placed in close opposed relationship to form a surface adapted to receive the area of a sheet material to be punched and the immediately surrounding area of the sheet material. The resilient backing members are supported in such a manner that their closely opposed edges are free to flex and thereby open a slot, under pressure from a punching means, to receive the punch-out from the work piece. In the event a punch-out is not forced completely through the opening thus provided, the flexed portions of the resilient backing means close and grip the punch-out as the pressure from the punching means is removed therefrom, thus gripping the punch-out sufficiently firmly to remove it from the sheet material when the work piece is removed from the apparatus. The closely opposed freely flexible portions of the backing means are preferably spaced somewhat apart with the distance between the opposed edges of these portions being less than the thickness of the punch-out, thus assuring gripping of the punch-out by the backing means in the event that the punch-out is not forced completely past the gripping surfaces of the resilient backing members.

Referring now to the drawings, a portable, manually operated perforating device, otherwise known as a "penching apparatus," embodying the present invention comprises a case 10, a chip-retaining backing board assembly or "pench" board 11, a prescored record card 12, a perforating template 13 and a cap 14. The case 10 includes a body portion 15 adapted to receive and slidably engage the backing board assembly 11. Body portion 15 may suitably consist of a three-sided frame or a tray-like member having a closed base. When the backing board assembly 11 has been fully inserted in the body 15 the record card 12 may be inserted in the apparatus so as to rest on the surface of the backing board. The record card 12 may be covered in turn if desired by the optional perforating template 13. The record card 12 and template 13 are held in place against the upper surface of the backing board 11 by means of a retaining member or guide 16 which may be connected to or integral with body portion 15 of the case 10. The case 10 is then closed by means of cap 14 which may be attached to the open end of the body portion 15 by means of pins 17 which seat in sockets 18 formed in body portion 15.

A plurality of resilient backing members 19, which in the illustrated embodiment take the form of strips of rubber, are placed with their edges 35 in closely opposed relationship to form the upper surface of the backing board 11 employed to support the record card 12. When the perforating apparatus is assembled and ready for use the perforations 21 in the template 13 are aligned with the corresponding scored index positions 22 in the record card 12 and each perforation 21 and its corresponding index position 22 is positioned above the juxtaposed edges 35 of adjacent resilient backing strips 19 in the backing board assembly 11. In lieu of separate strips 19, one may provide relatively flexible lip-like portions of a corresponding configuration on a common backing means, without departing from the spirit of the invention.

The record cards 12 employed with the apparatus are pre-scored or partially cut to define a plurality of index areas 22 adapted to be punched out of the record card as chips to provide sharply defined index slits 23 capable of being electrically sensed by tabulating or other types of processing machines.

The punching tool is a stylus 24 which is similar to the familiar retractable point mechanical pencil and may in fact conveniently consist of such a pencil with a retractable stylus incorporated in the end normally reserved for an eraser. The stylus may, however, take any other suitable form or cross section and have a sharp or blunt point or a point having a cross section corresponding to the area of the punch-out.

Figures 3, 4, 5, 6, 7, 8:
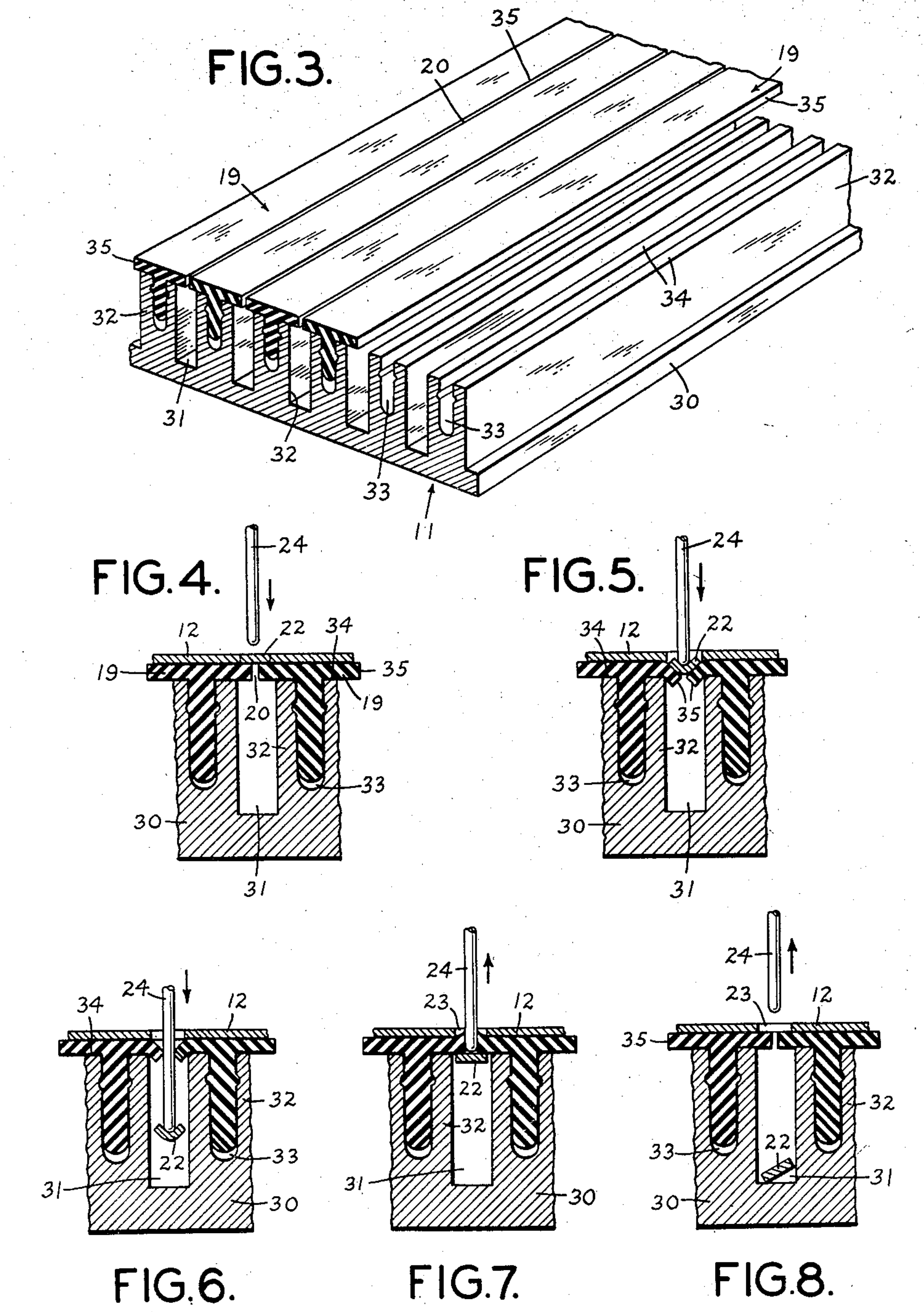
Figure 3 is a perspective view of a chip-retaining backing board assembly which forms a part of the apparatus of Figures 1 and 2.

Fig. 3 shows details of the construction of the chip-retaining backing board assembly or pench board 11 of Fig. 1. The pench board assembly 11 comprises a rigid base member 30 adapted to engage and hold a plurality of resilient backing members 19. The base member 30 contains a plurality of compartments or channels 31 adapted to receive chips punched out of a record card. The chip-receiving compartments may be of any suitable shape; the elongated channels 31 shown in the drawing being particularly suitable. The channels 31 are separated by intermediate wall portions 32 of the base member 30 which contain elongated grooves 33. The backing members 19 are formed of elongated strips of resilient material, preferably rubber, and have a generally T-shaped cross section. The grooves 33 in the base member 30 are adapted to receive and engage longitudinally elongated portions of the backing members 19 corresponding to the stems of their T-shaped cross sections. When a backing strip 19 is placed in each of the grooves 33 in the base member 30 the edges 35 of the portions of the adjacent backing members corresponding to the cross-bar of the T are presented toward each other with the space between them less than the thickness of card 12 and define a flat backing surface adapted to support a record card on the pench board. The edges 35 of adjacent backing strips 19 are free to flex under pressure to open the associated channel 31. The upper edges 34 of the wall portions 32 on each side of grooves 33 serve to support the under side of the flat cross-bar portions of the backing strips 19 longitudinally adjacent to the juncture of the stem with the cross-bar of the T. The outer edges 35 of the flat surfaces of the backing strips are unsupported. The cross section of the backing strips 19 may be of any suitable shape other than the T-shape illustrated as long as the members possess an upper surface adapted to receive the index portion 22 and the immediately surrounding area of the record card 12 and a lower surface adapted to engage the base member. Outstandingly successful results are attained with the backing members 19 out of contact with one another. As a variation, edges 35 of adjacent backing members 19 may be butted to form a continuous backing surface.

Fig. 4 shows a cross section of a portion of the base member 30 of the pench board of Fig. 3 including a chip-receiving channel 31. Two adjacent backing members 19 are shown supported by the edges 34 of wall portions 32 of the base board 30. The edges 35 of the cross-bar portions of the backing strips are in closely opposed relation as indicated at 20 above channel 31. A record card 12 having a prescored index position 22 is supported on the surface formed by the pair of adjacent resilient backing strips with the index portion 22 overlapping the space 20. The point of a stylus 24 is shown positioned vertically above and moving downwardly toward the index position 22.

In Fig. 5 the downwardly moving stylus 24 has contacted the scored index portion 22 and broken it away from the body of the record card 12. The broken away index portion of chip 22 is shown forced against the partially deformed edges 35 of resilient backing strips 19.

In Fig. 6 the stylus 24 has continued its downward motion from the position shown in Fig. 5 and has consequently forced the chip 22 between the deformed edges 35 of the backing strips 19. The chip 22 is shown attached to the end of the stylus 24 as might be the case if the stylus were provided with a sharp or irregular point. It should be noted that the deformed edges 35 of the backing strips 19 tightly hug the point of the stylus due to their resiliency.

In Fig. 7 the downward motion of the stylus has been reversed. The stylus 24 is shown partially withdrawn from the channel 31. It may be seen that the chip 22 attached to the stylus point comes in contact with the lower surface of the edges 35 of the backing strips 19 when the stylus is withdrawn.

In Fig. 8 the upward motion of the stylus 24 has continued to the point where the stylus has been completely withdrawn from the pench board with the result that the edges 35 of the backing strips have stripped the chip 22 from the point of the stylus and deposited it in channel 31. The operation of the apparatus of the invention is essentially the same when a comparatively blunt stylus is employed which would not pierce the chip 22. In this case the chip would, in most cases, fall to the bottom of the channel 31 as soon as it was forced through the yieldable juncture or narrow opening 20 between the backing strips.

A perforating template 13 is preferably employed with the penching apparatus to aid in positioning the stylus on the desired scored index position in the record card. The optional template 13 has however been omitted from Figs.

4 to 8 for simplicity of explanation. As indicated the punched out portions fall into and are retained in channels 31. Backing members 19 are readily removable from their channels 33 to facilitate the removal of chips when necessary.

It has been found that the punch-out 22 is not always forced completely through the yieldable juncture or narrow opening 20 between the resilient edges 35 of the backing members so as to fall freely into the punch-out receiving channel 31. This is particularly true when the punch-out is not centered above the juncture 20 or when the stylus is not applied to the central portion of the index position to be punched out. It is one of the advantages of the present invention, however, that it is not essential for either the index position of the card or other work piece or the stylus to be carefully aligned with the juncture 20. When a punch-out is not forced completely through the juncture 20 and past the edges 35 of the resilient backing members, for whatever reason, it is gripped and held firmly by the edges of the resilient backing members. When the stylus is withdrawn from the pench board the punch-out is either deposited in the channel 31 or held firmly in the juncture or narrow opening 20 between the edges 35 of the resilient backing members. Therefore, when a punch-out is not completely severed from the work piece by the punching operation itself the partially detached punch-out is gripped by the backing board so as to be severed from the work piece when the latter is removed from the apparatus.

The advantages of the novel penching apparatus shown in the drawings are readily apparent. In addition to its obvious portability, simplicity of manufacture and operation it provides means for the positive severance and complete removal of punched-out chips from a pre-scored record card thus eliminating the possibility of such chips remaining attached to the record card by a few fibers of paper or other material and thus causing inaccurate operation of a card processing machine. This result is attained to a large extent by the gripping action provided by the adjacent edges of the novel resilient backing strips in the new apparatus.

Although the invention has been described above in connection with a portable, manually operated perforating device of unique construction for which it is especially suitable, the inventive concept is applicable to other types of apparatus. For example, mechanically operated punching mechanisms can also be provided with means of insuring the complete severance and removal of punched-out portions from a work piece according to the present invention. The invention may even be employed in the form of a backing board or surface composed of the resilient backing members applied to a curved platen adapted for use in perforating a sheet material by means of a rolling punching device.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

What is claimed is:

1. Backing means for use in removing punch-outs from an area of a sheet-like member as the latter is punched, comprising resilient means having two portions thereof capable of being flexed relative to each other and normally disposed in close opposed relation to form a surface, means for aligning and receiving a sheet-like member with the area thereof to be punched and the portion of the sheet-like member immediately adjacent thereto aligned with and juxtaposed to said surface, and holding means for supporting said resilient means with said portions thereof free to flex and open a slot under pressure for receiving a punch-out from said sheet-like member and to close said slot as the pressure is removed therefrom.

2. In an apparatus for entering index slits in a record card by punching previously scored index portions from said card, a base member, a plurality of elongated resilient backing members having flexible edge portions, said base member supporting said resilient backing members with said edge portions thereof in closely opposed relation for supporting a record card, means for aligning a record card in juxtaposed relation to said resilient backing members and with its scored index portions in registration with said flexible edge portions, the closely opposed edge portions of said resilient backing members being unsupported and free to flex.

3. In an apparatus for entering sharply defined index slits in a prescored record card by punching chips from scored index positions of said card, a base member, a plurality of elongated resilient backing members, each generally T-shaped in cross section and having a stem portion and a flexible transverse portion, and said base member engaging said stem portions and supporting said backing members with said transverse portions normally disposed in close opposed end-to-end relation to form a surface and with the outer extremities of the transverse portions free to flex.

4. A backing board for use in an apparatus for entering sharply defined index slits in a prescored record card by punching chips from the scored index positions of said card, comprising a base member having a plurality of channels formed therealong, a plurality of elongated resilient backing members each generally T-shaped in cross section forming a stem portion and a flexible transverse portion, said backing members being supported by said base member in mutually aligned side by side relation with said stem portions thereof extending in alternate ones of said channels, and the extremities of the transverse portions of adjacent backing members being in close opposed relation and overhanging remaining ones of said channels, the transverse portions of said backing members being adapted to receive said record card thereagainst with the prescored portions thereof juxtaposed to said extremities.

5. A backing board for use in an apparatus for entering sharply defined index slits in a prescored record card having a predetermined thickness by punching chips from the scored index positions of said card, comprising a base member having a plurality of channels formed therealong, a plurality of elongated resilient backing members each generally T-shaped in cross section and forming a stem portion and a flexible transverse portion, said backing members being supported by said base member in mutually aligned side by side relation with said stem portions thereof extending in alternate ones of said channels, and the extremities of said transverse portions of adjacent backing members being in close spaced relation overhanging the remaining ones of said channels, the distance between said extremities being less than said thickness, said transverse portions forming a surface adapted to receive said card thereagainst with the scored portions thereof juxtaposed to said extremities.

6. An apparatus for punching and stripping punched-out portions from a prescored record card having a predetermined thickness, comprising an elongated tray-like frame member, a base member seated in said frame member, said base member having a plurality of channels formed therealong, a plurality of elongated resilient backing members each generally T-shaped in cross section forming a stem portion and a flexible transverse portion, said backing members being supported by said base member in mutually aligned side by side relation with said stem portions thereof extending in alternate ones of said channels, the extremities of said transverse portions of adjacent backing members being in close spaced relation overhanging the remaining ones of said channels, the distance between said extremities being less than said thickness, and the side walls of said frame member being turned inwardly and adapted to position a record card against said backing members with the scored portions of the card juxtaposed to said extremities of said transverse portions.

7. In an apparatus for punching and stripping punched-out portions from a work piece, resilient means forming a backing surface for the work piece, said resilient means comprising at least one pair of relatively flexible lip portions normally disposed in closely opposed relation and forming part of said surface, means for receiving and aligning a work piece and supporting the same with the area thereof to be punched in aligned juxtaposed relation with said surface and said lip portions, and means supporting said resilient means leaving the closely opposed lip portions of said resilient means free to flex under pressure and open a slot for receiving a punch-out and to close said slot as pressure is removed therefrom.

References Cited in the file of this patent

UNITED STATES PATENTS

| | | |
|---|---|---|
| 65,653 | Dewey | June 11, 1867 |
| 139,718 | Kempshall | June 10, 1873 |
| 278,091 | Burk | May 22, 1883 |
| 422,056 | Martin | Feb. 25, 1890 |
| 561,441 | Schmidt | June 2, 1896 |
| 882,474 | Lott | Mar. 17, 1908 |
| 1,086,200 | Michie | Feb. 3, 1914 |
| 1,799,374 | Hurley | Apr. 7, 1931 |
| 1,871,597 | English | Aug. 16, 1932 |
| 2,068,037 | Osborn | Jan. 19, 1937 |
| 2,077,232 | Grahek | Apr. 13, 1937 |

Dedication 2,949,292.—*Carl F. Abissi*, Vestal, N.Y. PERFORATING APPARATUS. Patent dated Aug. 16, 1960. Dedication filed Aug. 4, 1972, by the assignee, *International Business Machines Corporation.*

Hereby dedicates to the Public the remaining term of said patent.

[*Official Gazette May 8, 1973.*]